US012786270B2

(12) United States Patent
Yerli

(10) Patent No.: US 12,786,270 B2
(45) **Date of Patent: *Nov. 3, 2026**

(54) LEVEL OF DETAIL MANAGEMENT WITHIN VIRTUAL ENVIRONMENTS

(71) Applicant: TMRW Group IP, Luxembourg (LU)

(72) Inventor: Cevat Yerli, Dubai (AE)

(73) Assignee: TMRW GROUP IP, Luxembourg (LU)

( * ) Notice: Subject to any disclaimer, the term of this patent is extended or adjusted under 35 U.S.C. 154(b) by 164 days.

This patent is subject to a terminal disclaimer.

(21) Appl. No.: 18/936,453

(22) Filed: Nov. 4, 2024

(65) Prior Publication Data

US 2025/0063085 A1 Feb. 20, 2025

Related U.S. Application Data

(63) Continuation of application No. 17/889,112, filed on Aug. 16, 2022, now Pat. No. 12,166,818.

(51) Int. Cl.

*H04L 67/61* (2022.01)
*H04L 67/104* (2022.01)
*H04N 5/272* (2006.01)

(52) U.S. Cl.

CPC ............ *H04L 67/104* (2013.01); *H04L 67/61* (2022.05); *H04N 5/272* (2013.01)

(58) Field of Classification Search

CPC .............................. H04L 67/104; H04N 5/272
See application file for complete search history.

(56) References Cited

U.S. PATENT DOCUMENTS

| | | | | |
|---|---|---|---|---|
| 11,012,482 | B1 * | 5/2021 | Yerli | H04L 67/306 |
| 2013/0024756 | A1 | 1/2013 | Basso | H04W 4/70 715/202 |

(Continued)

FOREIGN PATENT DOCUMENTS

| | | | |
|---|---|---|---|
| EP | 3962038 | A1 | 2/2022 |
| EP | 3962038 | A | 3/2022 |

OTHER PUBLICATIONS

"HLODs: Hierarchical Levels of Detail." Department of Computer Science, University of North Carolina at Chapel Hill, Feb. 2004, 2 pages.

(Continued)

*Primary Examiner* — Amal S Zenati
(74) *Attorney, Agent, or Firm* — BRYAN CAVE LEIGHTON PAISNER LLP

(57) ABSTRACT

A level of detail (LOD) management method comprises receiving one or more media content item publishing requests; publishing one or more media content items to at least one cell representing at least one area of interest from at least one portion of a virtual environment; measuring a distance within the virtual environment between at least one user graphical representation representing a subscribing client device and one or more published media content items; receiving at least one subscription request from the subscribing client device to subscribe to one or more published media content items; calculating priority data based on the measured distance; adjusting the level of detail of a viewing field per user graphical representation in the corresponding cell based on the level of priority; and sending the adjusted level of detail along with the subscribed media content item to the subscribing client device.

20 Claims, 7 Drawing Sheets

(56) References Cited

U.S. PATENT DOCUMENTS

| | | | | |
|---|---|---|---|---|
| 2014/0016793 | A1* | 1/2014 | Gardner | H04M 3/56 709/204 |
| 2015/0170396 | A1 | 6/2015 | Kornmann | |
| 2018/0115797 | A1 | 4/2018 | Wexler et al. | |
| 2018/0352303 | A1 | 12/2018 | Siddique | H04L 65/1069 |
| 2021/0049827 | A1 | 2/2021 | Lebaredian et al. | |
| 2022/0086203 | A1 | 3/2022 | Morris et al. | |

OTHER PUBLICATIONS

Saito, S., et al., "PIFuHD: Multi-Level Pixel-Aligned Implicit Function for High-Resolution 3D Human Digitization," arXiv:2004.00452v1 [cs.CV], Apr. 1, 2020, 10 pages.

Saito et al., "PIFuHD: Multi-Level Pixel-Aligned Implicit Function for High-Resolution 3D Human Digitization", Website: https://shunsukesaito.github.io/PIFuHD/, Apr. 1, 2020.

* cited by examiner

LEVEL OF DETAIL MANAGEMENT WITHIN VIRTUAL ENVIRONMENTS

REFERENCE TO PRIOR APPLICATIONS

This application is a Continuation of U.S. patent application Ser. No. 17/889,112, filed Aug. 16, 2022, hereby expressly incorporated by reference in its entirety.

FIELD

The current disclosure relates generally to the field of computer systems, and more specifically to a system, method and computer-readable medium enabling optimizations of level of detail within virtual environments using a publish-subscribe communication model.

BACKGROUND

As situations such as global pandemics have forced mobility restrictions worldwide, changing the way in which meeting, learning, shopping and working take place, remote collaboration, and interactions, including, and in particular, social interactions are gaining more importance. Various solutions are already available in the market to enable real-time communication and collaboration, ranging from chat applications to video telephony, such as Skype™ and Zoom™, or virtual offices for remote teams represented by 2D avatars, such as those provided by Pragli™. However, the low levels of realism, lack of or limited user presence, lack of shared space and low quality or possibilities of interactions one can perform when comparing the real-life experience to these solutions contribute to a feeling of loneliness or boredom for many users, in turn resulting sometimes in a lower productivity than when performing the same activities in person.

A proposed solution comprises the implementation of virtual presence in 3D videoconferencing platforms, whereby users can view each other, explore, move around and interact in shared spaces with each other, including video and audio communications. Graphics management of such applications when involving a large number of users can be compared to conventional systems designed to run virtual environments, for example, to massively multiplayer online games (MMOGs). However, MMOGs are limited in the way they scale to support very large numbers of users or entities within the virtual environments. As the number of users and entities increases, resource requirements increase as well, decreasing the quality of service (QOS) and user experience within the virtual environment. The same drawbacks thus apply for implementation in 3D teleconferencing platforms.

An intuitive area where computing optimizations can be implemented in order to improve graphics management is through level of detail (LOD) management, which is a computing optimization method that decreases the computation level of 3D graphics (e.g., resolution, textures, etc.) as an object to be rendered gets further away from a user. LOD management can thus increase the efficiency of computing processes in virtual environments, such as the rendering process by decreasing the workload on graphics pipeline usage. However, using typical client-server-based communication paradigm to implement such an LOD management, which is best suited for communication that typically takes place between two nodes, the client and the server, can be limiting for communication that is more complex (e.g., one-to-many or many-to-many). This is because modelling of these communications in a pure client/server-based approach results in difficult network code caused by mapping of those relationships and the corresponding resource provisioning. As a result, hosting a large number of videoconferencing participants (e.g., 1000s) in large, crowded 3D environments and managing LOD in such situations can be cumbersome with current technologies.

What is required are systems and methods that can enable optimizing LOD in large, crowded 3D environments to increase the participant-hosting capacities of 3D videoconferencing platforms that provide realism of interactions through video presence and smooth user experience and lower resource utilization.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure solves at least some of the drawbacks disclosed in the background through a system, method and non-transitory computer-readable medium enabling optimization of level of detail (LOD) in virtual environments.

An LOD management method of the current disclosure may be implemented by a system comprising at least one server computer of a server computer system including at least one processor and memory storing a distributed message exchange platform. The at least one processor executes instructions in memory, causing the at least one server computer to perform the method comprising receiving from a publishing client device, by a distributed message exchange platform distributed across a plurality of computers, one or more publishing requests to publish one or more media content items, wherein at least one of the media content items is a user graphical representation of a publishing client device user, the user graphical representation having a position and orientation within a virtual environment that is received by the distributed message exchange platform; publishing the one or more media content items to at least one cell representing at least one area of interest from at least one portion of the virtual environment; measuring, by the distributed message exchange platform, a distance within the virtual environment between a user graphical representation representing a subscribing client device and the one or more published media content items; calculating priority data based on the measured distance, wherein a level of priority of the priority data is inversely proportional to the measured distance; receiving a subscription request from the subscribing client device to subscribe to the one or more published media content items; adjusting, by a level of detail management module, a level of detail of a viewing field per user graphical representation in the corresponding cell based on the level of priority; and sending the adjusted level of detail along with the subscribed media content item to the subscribing client device.

In some embodiments, adjusting the level of detail comprises classifying subscriptions within the cell as low, medium and high priority levels; and applying simplification operations on frames of a low priority level and refining operations on frames of a high priority level. In yet further embodiments, the simplification and refining operations comprise at least adjusting resolution and framerate of corresponding frames of the viewing field per user graphical representation. In yet further embodiments, the simplification and refining operations comprise at least adjusting resolution and framerate of corresponding frames of the viewing field per user graphical representation. In yet further embodiments, the adjusting the level of detail further comprises comprising performing sound enhancements comprising 3D sound treatment based on the priority levels.

In some embodiments, the user graphical representation is created by a process comprising receiving a live data feed captured by at least one camera of a publishing client device; sending the captured data to the subscribing client device; performing a background removal of the user of the publishing client device in order to extract only the image representing the user; and inserting, by the subscribing client device, the user graphical representation into the virtual environment.

In some embodiments, the user graphical representation comprises a user 3D virtual cutout with a removed background, or a user real-time 3D virtual cutout with a removed background, or a video with a removed background, or a video without a removed background.

In some embodiments, the subscription request is performed based on a clicking action or other action received from the subscribing client device.

In some embodiments, the priority data is adjusted based on one or more of an available bandwidth, user profile, type of content item, number of content items within the corresponding cell, number of user graphical representations within the corresponding cell, or orientation angle of the user graphical representation to the content item, resulting in a corresponding adjustment of the level of detail.

In some embodiments, the priority data is further adjusted based on whether the user is a speaker or a listener.

In another aspect of the current disclosure, an LOD management system comprises a computer system including at least one processor and memory, the computer system being programmed to, at least: receive from a publishing client device, via a distributed message exchange platform, one or more publishing requests to publish one or more content items, wherein at least one of the content items is a user graphical representation of the publishing client device user; publish the one or more content items to at least one cell representing at least one area of interest from at least one portion of a virtual environment; measure a distance between at least one user graphical representation within the virtual environment representing a subscribing client device and the one or more published content items; receive a subscription request from the subscribing client device to subscribe to one or more published content items; calculate priority data based on the measured distance, wherein a level of priority of the priority data is inversely proportional to the measured distance; adjust the level of detail of a viewing field per user graphical representation in the corresponding cell based on the level of priority; and send the adjusted level of detail along with the subscribed content item to the subscribing client device via the distributed message exchange platform.

In some embodiments, said adjusting of the level of detail comprises classifying subscriptions within the cell as low, medium and high priority levels; and applying refining operations on frames of a high priority levels, wherein the refining operations comprise at least adjusting resolution and framerate of corresponding frames of the viewing field per user graphical representation. In further embodiments, the refining operations comprise application of a Pixel-aligned Implicit Function framework on the user graphical representations. In further embodiments, the refining operations further comprise sound enhancements comprising 3D sound treatment based on the priority levels.

In some embodiments, the virtual environment uses one or more of an octree data structure, a quadtree data structure, a binary space partitioning (BSP) tree data structure, a sparse voxel octree data structure, a 3D array, a k-dimensional (kD) tree, a point cloud, a wireframe model, a boundary representation (B-Rep), a constructive solid geometry tree (CSG tree), a bintree, or a hexagonal structure.

In some embodiments, the subscription request is performed based on a clicking action or other action received from the subscribing client device.

In some embodiments, the virtual environment is hosted as part of a videoconferencing platform enabling video communications between users.

In some embodiments, the priority data is adjusted based on one or more of an available bandwidth, user profile, type of content item, number of content items within the corresponding cell, number of user graphical representations within the corresponding cell, or orientation angle of the user graphical representation to the content item.

In some embodiments, the computer system comprises a media server computer using a multipoint conferencing unit (MCU) topology, or a selective forwarding unit (SFU) topology, or a Traversal Using Relay NAT (TURN) topology, or a spatially analyzed media server topology (SAMS).

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

Figure 1:
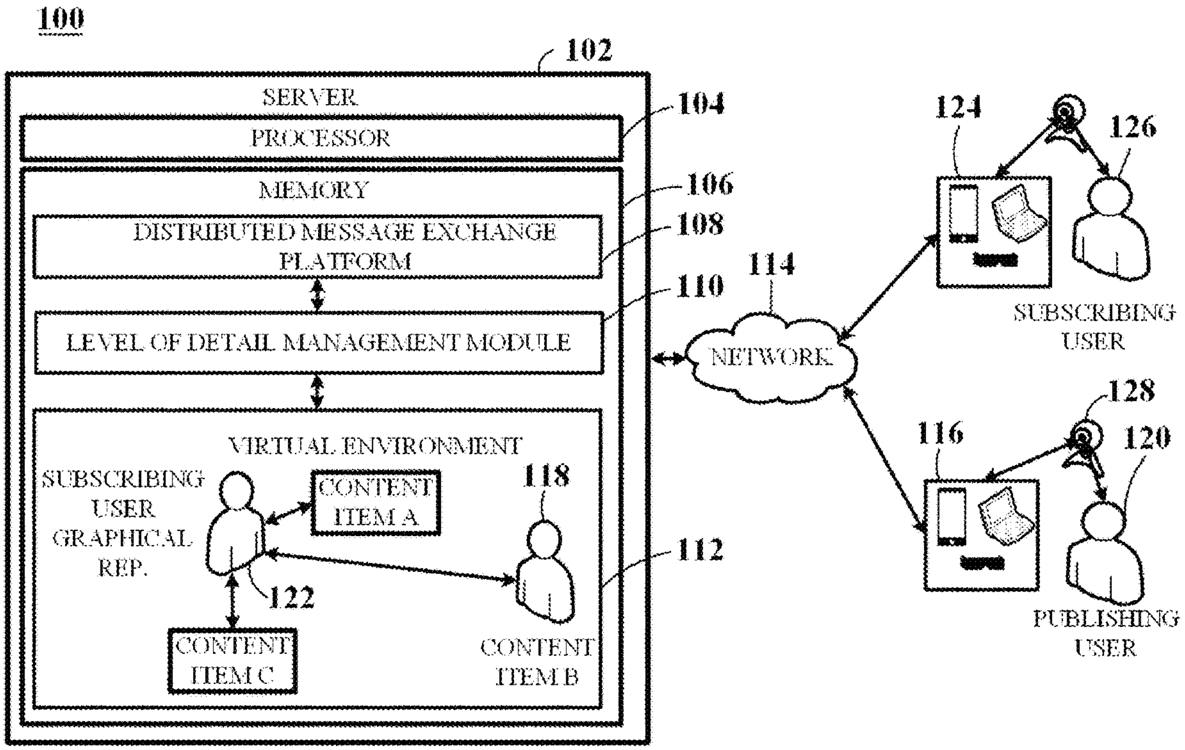
FIG. 1 shows a schematic representation of a system enabling level of detail (LOD) management in a virtual environment, according to an embodiment.

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure solves at least some of the drawbacks disclosed in the background through a system, method and non-transitory computer-readable medium enabling level of detail (LOD) management in virtual environments. The LOD management of the current disclosure is performed on media content items within a virtual environment enabling communications, such as in a videoconferencing platform implemented in a virtual environment, where a plurality of users may interact through corresponding user graphical representations. The LOD management of the current disclosure is based on the utilization of a publish-subscribe communication model that enables information exchange to which users can publish media content items that other users can subscribe to. The LOD management involves, in some embodiments, classification of subscriptions into a variety of priority data levels (e.g., high, medium, and low), where simplification operations are performed on the lower priority data levels and enhancement operations on the higher levels. The priority data levels may be based on a distance between user graphical representations and subscribed media content items, but other parameters may also be considered for extracting priority data levels required for LOD management.

In some embodiments, priority data is first calculated by a distributed message exchange platform based on distance between published items and a user graphical representation and subsequently adjusted based on other parameters. In an illustrative scenario, the distributed message exchange platform continuously receives position and orientation data for all user graphical representations and published media content. The distributed message exchange platform sends subscription information to subscribing client devices to allow them to subscribe to the content. The subscription information includes, in some embodiments, priority data and identifying information of objects to which the client devices may subscribe. Once a client device subscribes (e.g., by sending a subscription request to the distributed message exchange platform), the distributed exchange message platform sends the priority data and subscriptions identifying subscribing devices and subscribed content to an LOD management module, which adjusts the LOD to for each device for subscribed content. Information describing the adjusted LOD can be shared back to the distributed message exchange platform.

In this way, teachings of the current disclosure provide for novel and highly efficient resource optimization that can be applied for managing LOD in virtual environments, especially for crowded spaces hosting a large number (e.g., 100s or 1000s) of users. Further embodiments, details and benefits of the current disclosure are explained with regard to the figures in more detail below.

FIG. 1 shows a schematic representation of a system 100 enabling level of detail (LOD) management in a virtual environment, according to an embodiment.

System 100 comprises at least one server computer 102 comprising at least one processor 104 and memory 106 storing a distributed message exchange platform 108, an LOD management module 110 at least one virtual environment 112. The distributed message exchange platform 108 receives, through a network 114, one or more media content item publishing requests from at least one publishing client device 116, wherein at least one of the media content items is a user graphical representation 118 of a publishing client device user 120. The distributed message exchange platform 108 then publishes the received one or more media content items to at least one cell (not shown) representing at least one area of interest from at least one portion of the virtual environment 112. The virtual environment 112 may be arranged in a data structure, such as in a 3D data structure. The distributed message exchange platform 108 may obtain spatial relationship information such as measuring a distance between a subscribing user graphical representation 122 within the virtual environment 112 and one or more published media content items, represented in the sample illustration of FIG. 1 as content items A-C. Alternatively, a different module (e.g., LOD management module 110) may make such measurements and send measurement data to the distributed message exchange platform 108.

Subsequently, the distributed message exchange platform 108 receives at least one subscription request from a subscribing client device 124 employed by a subscribing user 126 to one or more of the published media content items. In some embodiments, subscription requests are sent automatically in response to a subscribing user graphical representation 122 approaching a published content item such that the measured distance between them is within a predefined threshold distance. The distributed message exchange platform 108 calculates priority data based on the measured distance, wherein the level of priority is inversely proportional to the distance measured between the at least one user graphical representation and one or more published media content items, and sends the priority data to the LOD management module 110. The LOD management module 110 then adjusts the level of detail of a viewing field per user graphical representation in the corresponding cell based on the extracted priority data, and then sends the adjusted level of detail along with the subscribed media content item to the subscribing client device 124.

Modules of the system 100 of the current disclosure, comprising, e.g., the distributed message exchange platform 108, LOD management module 110, and virtual environment 112 refer to software modules comprising discrete pieces of computer code which may be independently created and maintained to be used for the purposes described herein. The modules can be distributed for and used by system 100 to use the functionality of the different modules. The software modules may be connected to corresponding hardware modules, which may be a selection of independent electronic circuits configured to provide the functions of the corresponding software modules. Through virtualization and distributed computing techniques, the modules of the current disclosure may be distributed across a plurality of computing devices, such as a plurality of server computers connected to each other through a network.

The distributed message exchange platform 108 of the current disclosure is a software module comprising a virtual layer including computer code enabling the exchange and management of data and resources, such as from a plurality of server or client computing devices. The term "distributed" means deployed across a plurality of computing devices, such as server computing devices which can be configured in different physical areas for serving client devices that are in different parts of a geographical area. In some embodiments, the distributed message exchange platform 108 uses a publish-subscribe model, which is a model of communication based on the production and consumption of content, which differs from the commonly-used client/server-based communication model where communication usually takes place between two nodes: the client and the server. Such a communication through the publish-subscribe model may be enabled to be anonymous, meaning that server computers 102 and/or publishing client devices do not need to know which subscribing client devices 124 subscribed to which published media content; likewise, subscribing client devices 124 do not need to know which entities have published the published media content items. The publish-subscribe model enables information exchange so that everybody can publish and receive information, enabling greater degrees of flexibility than typical client-server models. This ability to exchange information is used by the LOD management module to implement LOD management on subscriptions that are classified according to priority data levels, resulting in a highly flexible and optimized LOD management that consumes fewer computing resources than standard LOD management methods. In this way, users of client devices may freely explore large or crowded areas of virtual environments and, because of the reduced consumption of computing resources, can subscribe to several published media items while experiencing an enhanced and smooth quality of service and quality of experience.

In some embodiments, the virtual environment 112 is hosted as part of a videoconferencing platform enabling video communications between users. The virtual environment 112, when hosted as part of a videoconferencing platform, may enable sharing in real-time a plurality of experiences, such as live performances, concerts, webinars, keynotes, and the like, to a plurality (e.g., thousands or even millions) of user graphical representations. These virtual performances may be presented by and or multi-casted to a plurality of instances of a virtual environment 112 to accommodate a large number of users from various parts of the world. The videoconferencing platform may enable a plurality of social interactions such as chatting, screen sharing, speaking, sending or receiving multimedia files, hand-raising, preparation of meeting-summaries, moving objects, playing games, performing transactions, engaging in private or group conversations, and the like. Such a videoconferencing platform may use any suitable system architecture to enable communications in virtual environments.

In some embodiments, when the virtual environment utilizes a hybrid system architecture, which includes a client-server side and a peer-to-peer (P2P) side. In an embodiment the client-server side comprises web or application servers. The client-server side may be further configured to include secure communication protocols; micro-services; a database management system; a database; and/or a distributed message and resource distribution platform. Server-side components may be provided along with the client devices that communicate to the servers through a network. The client-server side defines the interaction between the one or more clients and the server through the network, including any processing performed by a client side, a server side, or a receiving client side. In an embodiment, one or more of the corresponding clients and servers perform the necessary image and media processing according to various rule-based task allocation combinations. In an embodiment, the web or application servers are configured to receive client requests employing the secure communication protocols and process the client requests by requesting the micro-services or data corresponding to the requests from the database using a database management system. The micro-services are distributed utilizing a distributed message and resource distribution platform using the publish-subscribe model.

The P2P side comprises a P2P communication protocol enabling real-time communication between client devices in the virtual environment; and a rendering engine configured to enable the client device to perform real-time 3D rendering of live session elements therein included (e.g., user graphical representations) in the virtual environment. An example of a suitable P2P communication protocol may be a Web Real-Time Communication (WebRTC) communication protocol, which is collection of standards, protocols, and JavaScript APIs, which, in combination, enable P2P audio, video, and data sharing between peer client device. An example of a suitable rendering engine may be 3D engines based on WebGL, which is a JavaScript API for rendering 2D and 3D graphics within any compatible web browser without the use of plug-ins, allowing accelerated usage of physics and image processing and effects by one or more processors of the client device (e.g., one or more graphic processing units (GPUs)). In an embodiment, the P2P side further includes a computer vision library configured to enable the client device to perform real-time computer vision tasks in the virtual environment. An example of a suitable computer vision library may be OpenCV, which is a library of programming functions configured mainly for real-time computer vision tasks. Using such a hybrid model of communication may enable rapid P2P communications between users reducing latency problems while providing web services and resources to each session, enabling a plurality of interactions between users and with content in the virtual environment.

The virtual environment 112 may refer to a virtual scene, world or universe where users can explore, subscribe to and interact with published media content items therein, communicate with each other, and the like. In an example, various virtual environments 112 may be combined to form a virtual world. For instance, a plurality of virtual environments 112 of stores may be combined in a single virtual shopping mall, where users can explore via their user graphical representation, subscribe to different published media content items, and interact with each other. The virtual environment comprises assets that may be modeled through a plurality of software platforms or software engines. The assets may be stored in memory 106 of the one or more server computers 102 and may be published in the distributed message exchange platform 108. The assets may be defined in a scene description, which may be in the form of a scene graph comprising properties and values and which may be based on models. The models are descriptions of a three-dimensional object defined by data comprising geometry, textures, physics, lighting, materials, etc. The assets may be published by publishing client devices 116 in the distributed message exchange platform 108 that connects to the virtual environment 112. In one example, the publishing client devices 116 are one or more computing devices used in the creation of the virtual environment 112, such as of the owner or administrator of the virtual environment 112, who publishes the virtual environment 112 through the distributed message exchange platform 108. In another embodiment, the publishing client devices 116 are employed by users of the virtual environment 112 that may publish media content items in the distributed message exchange platform 108 for the subscription of subscribing client devices 124.

A virtual environment 112 thus refers to a virtual construct (e.g., a virtual model) that may be designed through any suitable 3D modelling technique through computer assisted drawing (CAD) methods. In some embodiments, the virtual environment 112 refers to a virtual construct that is scanned from a real construct (e.g., a physical room) through any suitable scanning tools, comprising image-scanning pipelines input through a variety of photo, video, depth measurements, and/or simultaneous location and mapping (SLAM) scanning in order to generate the virtual environment 112. For example, radar-imaging, such as synthetic-aperture radars, real-aperture radars, Light Detection and Ranging (LIDAR), inverse aperture radars, monopulse radars, and other types of imaging techniques may be used to map and model real-world constructs and turn them into a virtual environment 110. In other embodiments, the virtual environment 110 is a virtual construct that is modelled after a real construct (e.g., a room, building or facility in the real world).

The media content items may comprise any of 2D or 3D image data, 3D geometries, video data, media data, audio data, textual data, haptic data, time data, 3D entities, 3D dynamic objects, textual data, time data, priority data, security data, positional data, lighting data, depth data, infrared data, and corresponding metadata, amongst others. In one example, the media content item includes a user graphical representation of a publishing client device, which may be subscribed by nearby subscribing client devices 124 when their user graphical representation is within a set of spatial parameters (e.g., within a threshold distance, in line of sight, etc.). In other embodiments, the media content item includes interactive applications or ads that a subscribing client devices may subscribe to.

In some embodiments, the virtual environment 112 uses a data structure selected from one or more of an octree data structure, or a quadtree data structure, or a BSP tree data structure, or a sparse voxel octrees data structure, or 3D arrays, kD trees, point clouds, wireframes, boundary representations (B-Rep), constructive solid geometry trees (CSG trees), bintrees, and hexagonal structures. The 3D data structure serves the function of accurately and efficiently representing the data of each of the geometries of the virtual objects in virtual environment 112. A correct selection of the 3D data structure depends on the origin of the data, the precision of geometries sought for during rendering; whether the rendering is done in real-time or is pre-rendered; whether the rendering is performed via the cloud servers, via the user devices, fog devices, or combinations thereof; the specific applications for which the persistent virtual world system is employed, for example, a higher level of definition may be required for medical or scientific applications than for other types of applications; memory capacities from the servers and from the user devices and thus, desired memory consumption; and others.

In some embodiments, the user graphical representation is created by a process comprising receiving, by the at least one server computer 102, a live data feed captured by at least one camera 128 of a publishing client device 116; sending the captured data to the subscribing client device 124 via the sever 102 or through a P2P architecture; performing a background removal of the user 120 of the publishing client device 116 in order to extract only the image representing the user 120; and inserting, by the subscribing client device 124, the user graphical representation 118 into the virtual environment 112.

In some embodiments, the client devices may be one or more of mobile devices, personal computers, laptops, game consoles, media centers, smart contact lenses, and head-mounted displays, amongst others. The cameras 110 may be one or more of a 2D or 3D camera, 360 degree camera, web-camera, RGBD camera, CCTV camera, professional camera, mobile phone camera, depth camera (e.g., LIDAR), or a light-field camera, amongst others.

In some embodiments, the user graphical representation comprises a user 3D virtual cutout with a removed background, or a user real-time 3D virtual cutout with a removed background, or a video with a removed background, or a video without a removed background.

In the current disclosure, a user 3D virtual cutout may include a virtual replica of a user constructed from a user-uploaded or third-party-source 2D photo. In an embodiment, the user 3D virtual cutout is created via a 3D virtual reconstruction process through machine vision techniques using the user-uploaded or third-party-source 2D photo as input data, generating a 3D mesh or 3D point cloud of the user with removed background. In one embodiment, the user 3D virtual cutout may have static facial expressions. In another embodiment, the user 3D virtual cutout may comprise facial expressions updated through the camera feed. In yet another embodiment, the user 3D virtual cutout may comprise expressions that may be changed through buttons on the user graphical interface, such as buttons that permit the user 3D virtual cutout to smile, frown, be serious, and the like. In yet a further embodiment, the user 3D virtual cutout uses combinations of aforementioned techniques to display facial expressions. After generating the user 3D virtual cutout, the status and/or facial expressions of the user 3D virtual cutout may be continuously updated by, e.g., processing the camera feed from the user. However, if the camera is not turned on, the user 3D virtual cutout may still be visible to other users with an unavailable status and static facial expressions. For example, the user may be currently focused on a task and may not want to be disturbed (e.g., having a "do not disturb" or "busy" status), therefore having his or her camera off. At this moment, the user 3D virtual cutout may simply be sitting on his or her desk and may either be still or may perform pre-configured moves such as typing. However, when the user camera is again turned on, the user 3D virtual cutout may be again updated in real-time with respect to the user facial expressions and/or movements. Standard 3D face model reconstruction (e.g., 3D face fitting and texture fusion) techniques for the creation of the user 3D virtual cutout may be used so that the resulting user graphical representation is clearly recognizable as being the user.

A user real-time 3D virtual cutout may include a virtual replica of a user based on the real-time 2D or 3D live video stream data feed obtained from the camera and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. For example, the user real-time 3D virtual cutout may be generated from 2D video from a camera (e.g., a webcam) that may be processed to create a holographic 3D mesh or 3D point cloud. In another example, the user real-time 3D virtual cutout may be generated from 3D video from depth cameras (e.g., LIDARs or any depth camera) that may be processed to create a holographic 3D mesh or 3D point cloud. Thus, the user real-time 3D virtual cutout represents the user graphically in three dimensions and in real time.

A video with removed background may include a video streamed to a client device, wherein a background removal process has been performed so that only the user may be visible and then displayed utilizing a polygonal structure on the receiving client device. Video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In some embodiments, the client devices 118 and at least one cloud server computer 102 connect through a wired or wireless network. In some embodiments, the network may include millimeter-wave (mmW) or combinations of mmW and sub 6 GHz communication systems, such as $5^{th}$ generation wireless systems communication (5G). In other embodiments, the system may connect through wireless local area networking (Wi-Fi). In other embodiments, the system may communicatively connect through $4^{th}$ generation wireless systems communication (4G), may be supported by 4G communication systems, or may include other wired or wireless communication systems.

In some embodiments, the at least one server computer 102 is a media server computer using a Multipoint Control Unit (MCU) topology, or a selective forwarding unit (SFU) topology, or a Traversal Using Relay NAT (TURN) topology, or a spatially analyzed media server topology (SAMS).

In some embodiments, the at least one cloud server may be an intermediary server, meaning that the server is used to facilitate and/or optimize the exchange of data between client devices. In such embodiments, the at least one cloud server may manage, analyze process and optimize incoming image and multimedia streams and manage, assess, optimize the forwarding of the outbound streams as a router topology (for example but not limited to SFU, SAMS, multimedia server routers, or an image and media processing (for example but not limited to decoding, combining, improving, mixing, enhancing, augmenting, computing, manipulating, encoding) and forwarding server topology (for example but not limited to MCU, cloud media mixers, cloud 3D renderer, and the like), or other server topologies.

In embodiments where the intermediary server is a SAMS, such media server manages, analyze and processes incoming data of each publishing client device (e.g., including but not limited to meta-data, priority data, data classes, spatial structure data, three dimensional positional, orientation or locomotion information, image, media, scalable video codec based video) and in such analysis optimizes the forwarding of the outbound data streams to each subscribing client device through the distributed message exchange platform 108 by modifying, upscaling or downscaling the media for temporal (varying frame rate), spatial (e.g., different image size), level of detail, quality (e.g., different compression or encoding based qualities) and color (e.g., color resolution and range) based on the specific subscribing client device user's spatial, three dimensional orientation, distance and priority relationship to such incoming data achieving optimal bandwidths and computing resource utilizations for one or more user client devices.

Figure 2:
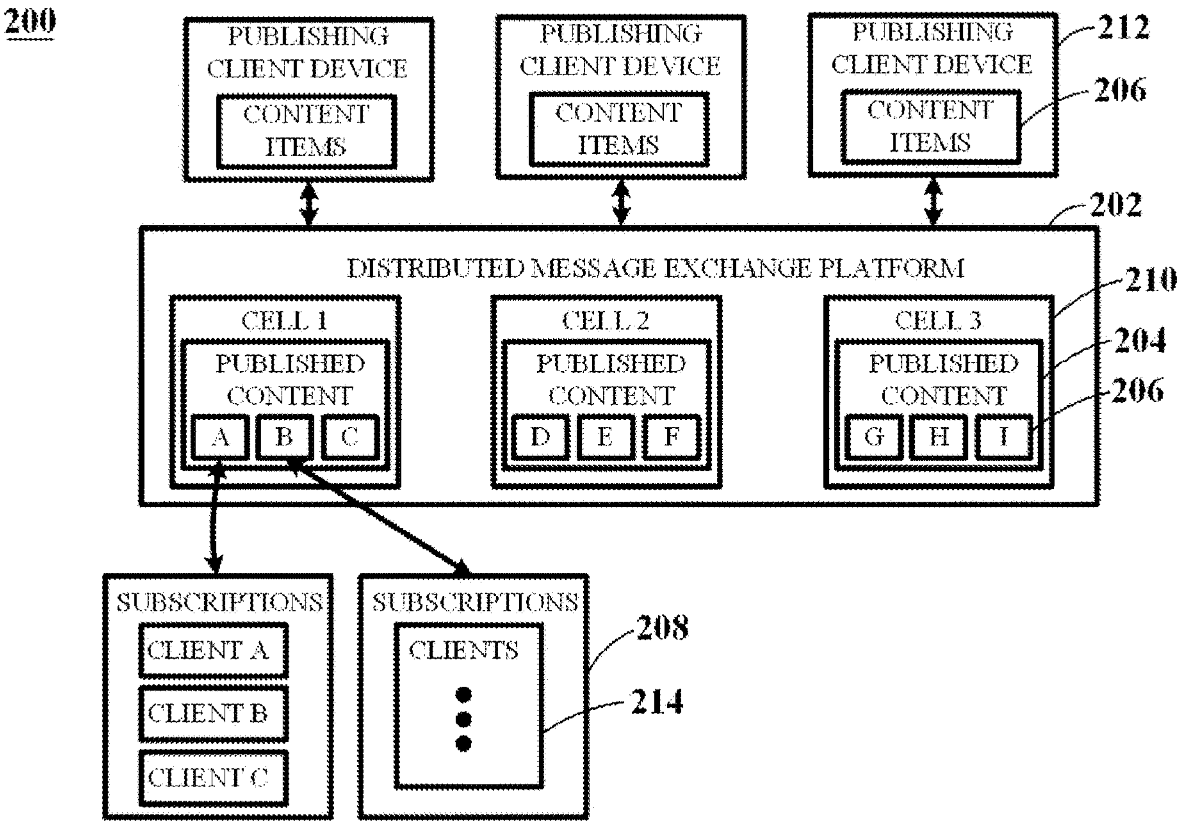
FIG. 2 depicts a schematic representation of a distributed message exchange platform managing published content items and subscriptions in a plurality of cells, according to an embodiment.

FIG. 2 depicts a schematic representation of a system 200 including a distributed message exchange platform 202 managing content 204 in the form of published media content items 206 and subscriptions 208 in a plurality of cells 210, according to an embodiment.

In the example of FIG. 2, publishing client devices 212 publish media content items 206 on one or more cells 210 of the distributed message exchange platform 202. Each cell represents at least one area of interest from at least one portion of a virtual environment. The distributed message exchange platform 202 receives the published media content items 206 and provides the published media content items 206 to subscribing client devices 214.

A single subscribing client device 214 may subscribe simultaneously to a plurality of published content items 206, which may be transmitted on demand to the subscribing client devices 214 by the distributed message exchange platform 202 via a network utilizing the publish-subscribe model detailed in FIG. 1.

In some embodiments, subscriptions 208 by subscribing client devices 214 are determined automatically in response to a measured distance between subscribing user graphical representations within the virtual environment comprising the published content items 206. In other embodiments, subscription requests are further performed based on a clicking or other type of action (e.g., looking at for a determined number of seconds, waving at, gesturing at, blinking at, etc.) received from the subscribing client device.

Figure 3:
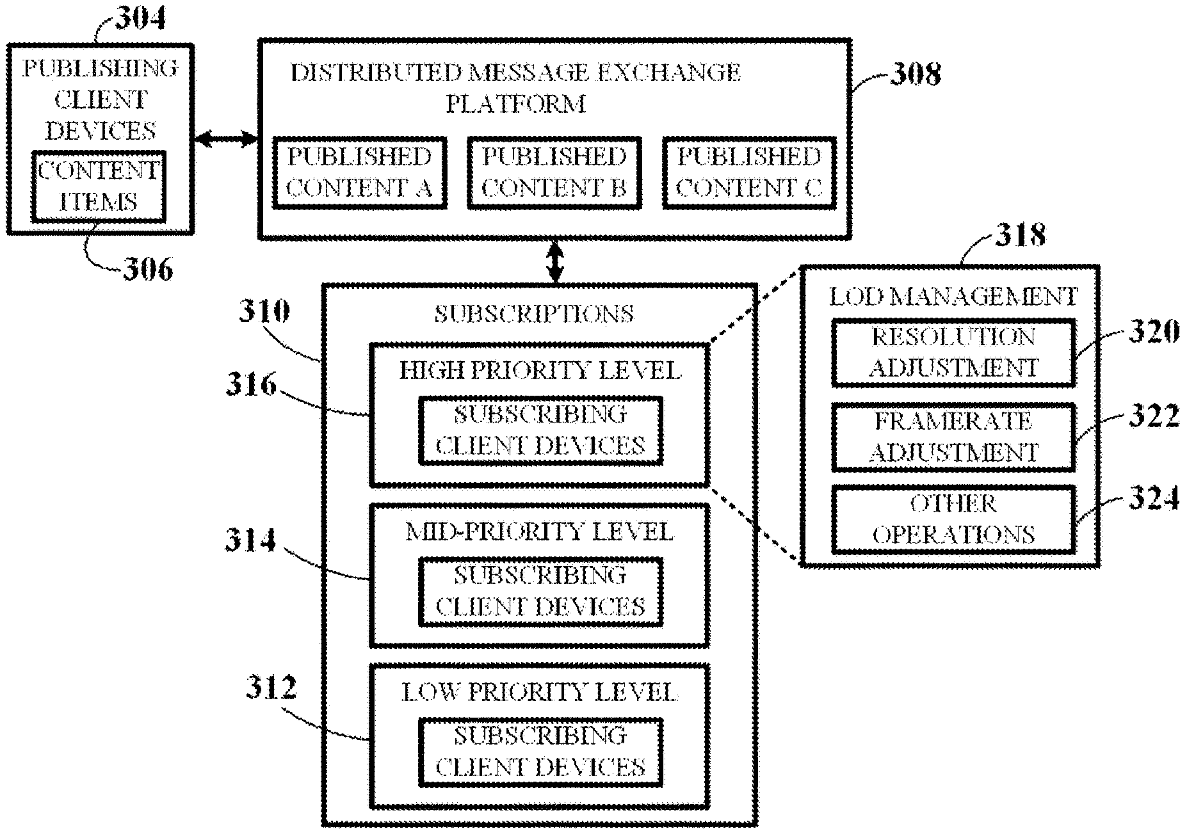
FIG. 3 depicts a schematic representation of subscription priority data levels that are used for LOD management, according to an embodiment.

FIG. 3 depicts a schematic representation of subscription priority data levels 302 that are used for LOD management of the current disclosure, according to an embodiment.

In the example illustration of FIG. 3, a publishing client device 304 publishes media content items 306 including published content items A-C to a distributed message exchange platform 308. Subscriptions 310 of a subscribing client device are then classified as low priority level 312, medium priority level 314 and high priority level 316. This classification may be based on a distance measured by at least one LOD management module (e.g., LOD management module 110 stored in memory 106 of the at least one server computer 102) between the subscribing user graphical representation and at least one published media content item 306 within the cells representing the areas of the virtual environment where the media content items have been published, wherein the level of priority is inversely proportional to said distance between subscribing user graphical representations. Thus, for example, a low priority level 312 may indicate that a subscribing user graphical representation is relatively far away (e.g., within a first threshold distance) from a published media content item within the virtual environment; a medium-priority level 314 may indicate that a subscribing user graphical representation is relatively closer to (e.g., within a second threshold distance that is smaller than the first threshold distance) the published media content item within the virtual environment; and a high priority level 316 may indicate that a subscribing user graphical representation is close to (e.g., within a third threshold distance that is smaller than the second threshold distance) the published media content item within the virtual environment.

In some embodiments, the subscription request is further performed based on a clicking or other action (e.g., looking at for a determined number of seconds, waving at, gesturing at, blinking at, etc.) received from the subscribing client device. In such cases, the priority level is increased to enable a higher level of detail for the subscribed media content item. In other embodiments, priority data is further extracted based on one or more of an available bandwidth, user profile, type of content item, number of content items within the corresponding cell, number of user graphical representations within the corresponding cell, or orientation angle of the user graphical representation to the content item, or combinations thereof. Thus, the priority level classification may primarily be based on the distance within the virtual environment between the subscribing user graphical representation and published media content items within the field of view of the subscribing user, and then may utilize one or more of the parameters listed above to further adjust the priority level. For example, a subscribed media content item relatively close to a subscribing user graphical representation may determine a high LOD, however, other conditions such as having a low bandwidth or a relatively large number of user graphical representations or published media content items within the same area may reduce the LOD for that specific subscription. In another example, a user profile of a person having special entitlements (e.g., enabling HD for close-by media content items within a specific timeframe irrespective of other conditions) may enable him or her to view that same subscribed media content item in a higher definition or at a higher framerate.

The priority levels are used to adjust the LOD through the LOD management 318. LOD management 318 increases the efficiency of computing processes, such as the rendering process by decreasing the workload on graphics pipeline usage, typically vertex transformations, or by enhancing physical simulations, as different physical models can be associated to the subscribed media content items, from low to high fidelity models. This enables different simulations or rendering levels to be performed depending on the extracted priority level of the specific subscription 310. LOD management 318 allows also to provide an optimized user experience, depending on the specific requirements and context. Therefore, the same virtual environment and corresponding media content items can be simulated at different levels of detail to facilitate load balancing and computing optimizations, as a result enabling a higher number of users to participate in a specific virtual event while providing a suitable experience to users.

In some embodiments, LOD management 318 may comprise applying simplification operations on frames of lower priority levels within the data structure and refining operations on frames of higher priority levels within the data structure of the virtual environment. In yet further embodiments, the simplification and refining operations comprise resolution adjustment 320, framerate adjustment 322, and other operations 324.

Resolution adjustment 320 refers to modifying the resolution of the received media content by the subscribing client device based on the priority level of the subscribed media content items. Framerate adjustment 322 refers to modifying the framerate of the received media content by the subscribing client device based on the priority level of the subscribed media content items. Resolution and framerate may thus be adjusted such that a plurality of resolutions and framerates may be configured within a single media stream of the viewing perspective of a subscribing user. Such a combination may be performed by a SAMS or an MCU server as described with reference to FIG. 1. Other operations 324 of the LOD management 318 refer to operations such as occlusion culling, polygon reduction techniques, shader management, image enhancements, sound enhancements, etc.

In some embodiments, the image enhancements, which are part of the refining operations, comprise application of Pixel-aligned Implicit Function (PIFu) framework on the user graphical representations, as described in Shunsuke Saito et al., "PIFuHD: Multi-Level Pixel-Aligned Implicit Function for High-Resolution 3D Human Digitization," arXiv: 2004.00452v1 (April 2020). Saito et al. use the PIFu framework, which takes images with resolution of 512×512 as input and obtain low-resolution feature embeddings 128×128. To achieve higher resolutions, they then stack an additional pixel-aligned prediction module on top of this framework, where the fine module takes as input higher resolution images (1024×1024) and encodes into high-resolution image features (512×512). The second module then takes the high-resolution feature embedding as well as the 3D embeddings from the first module to predict an occupancy probability field. To further improve the quality and fidelity of the reconstruction, they first predict normal maps for the front and back sides in image space, and feed these to the network as additional input. The goal of the PIFu method is to achieve 3D human digitization, which can be achieved by estimating the occupancy of a dense 3D volume, which determines whether a point in 3D space is inside the human body or not. Since no explicit 3D volume is stored in memory during training, this approach is memory efficient, and more importantly, no discretization is needed for the target 3D volume, which is important in obtaining high-fidelity 3D geometry for the target human subjects.

In some embodiments, sound enhancements comprise 3D sound treatment. The 3D sound treatment may include applying different algorithms that enable the transformation of sound waves to mimic natural sound waves, which emanate from a point in a 3D space. This may be implemented in hardware such as stereo speakers, surround-sound speakers, speaker-arrays or headphones. Using 3D sound treatment, user graphical representations closer to the subscribing user graphical representation may be heard closer than those farther away, and may also consider the position and orientation of the sound sources, increasing realism of the experience.

Figure 4A:
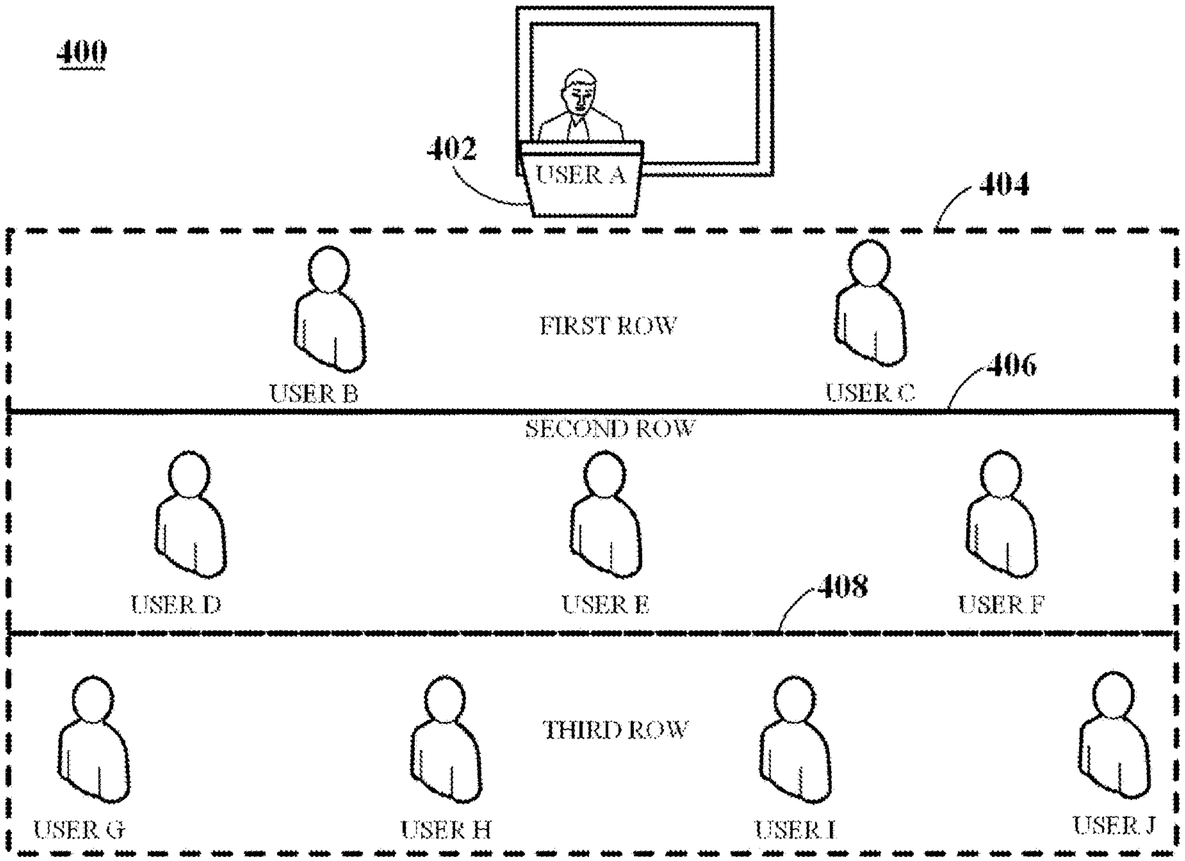
FIGS. 4A, 4B, and 4C depict an example application of LOD management in a virtual environment, according to an embodiment.
Figure 4B:
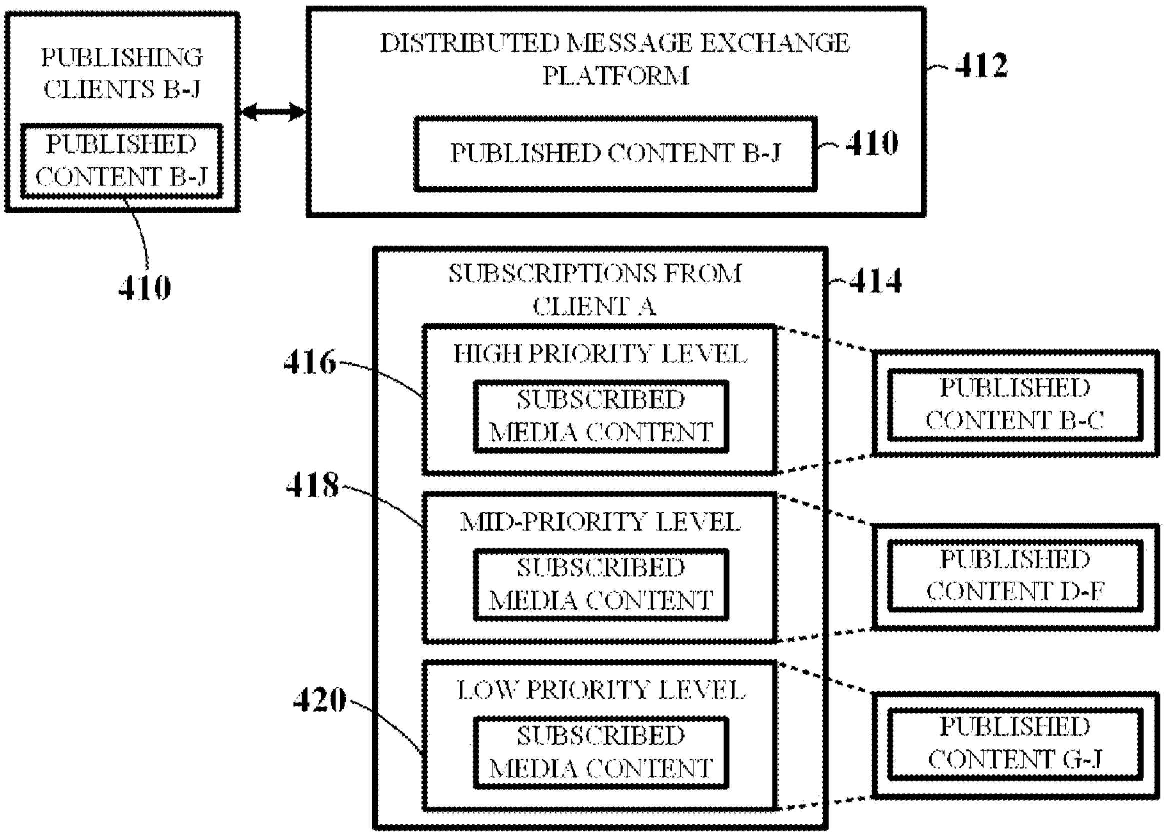

FIGS. 4A-4B depict an example application of LOD management in a virtual room 400 of a environment, according to an embodiment.

In FIG. 4A, a user A may be a speaker in a virtual podium 402 in the virtual room 400 (e.g., a virtual conference hall or classroom), and users B-J may be participants of the virtual conference. Users B-C are located in a first row 404 of the virtual room 400; users D-F are located in a second row 406 farther away from the first row; and users G-J are located in a third row 408 of the virtual room 400. For simplicity, the viewing perspective in FIG. 4A is a 3$^{rd}$ person viewing perspective, however, embodiments of the present disclosure contemplate each user having their corresponding viewing perspective set preferably in a first-person view, wherein the view is personally rendered based on the LOD management herein disclosed.

FIG. 4B shows an example of the LOD management of the current disclosure being used on the virtual room 400 of FIG. 4A considering the published media content items 410 from publishing client devices B-J, which are published in the distributed message exchange platform 412, and which are subscribed to by client A, illustrated as subscriptions from client A 414. In this example illustration, media content items closer to user A, i.e., in the first row 404, are considered high priority level subscriptions 416 by the client A. The media content items may comprise published media content from clients B and C (e.g., their user graphical representations) along with other media content items published, for example, by the creator of the virtual room, such as seats, ornaments, floors, and other items. In on example, those high priority level subscriptions 416 may be set at a high resolution and high framerate, e.g., a resolution of 512×512 pixels and a framerate of 30 frames per second (FPS).

Subscribed media content items in the second row 406, which include published media content items from clients D-F as well as other published media content items, are classified as medium-priority level 418, and may be set a resolution of 256×256 pixels and 25 FPS.

Finally, subscribed media content items in the third row 408, which include published content from clients G-J as well as other published media content items, are classified as low priority level 420 and may be set at a resolution of 32×32 pixels and 20 FPS.

The combined frame may thus have 3 different resolutions and framerates, each with different participants and media content items, all of which may be combined by the media server computer before sending them to the subscribing client device A. Such an LOD management based on the publish-subscribe model within the virtual environment 400 thus reduces resource utilization and improves the QoS and QoE of users participating in, e.g., videoconferencing sessions within the virtual room 400.

Figure 4C:
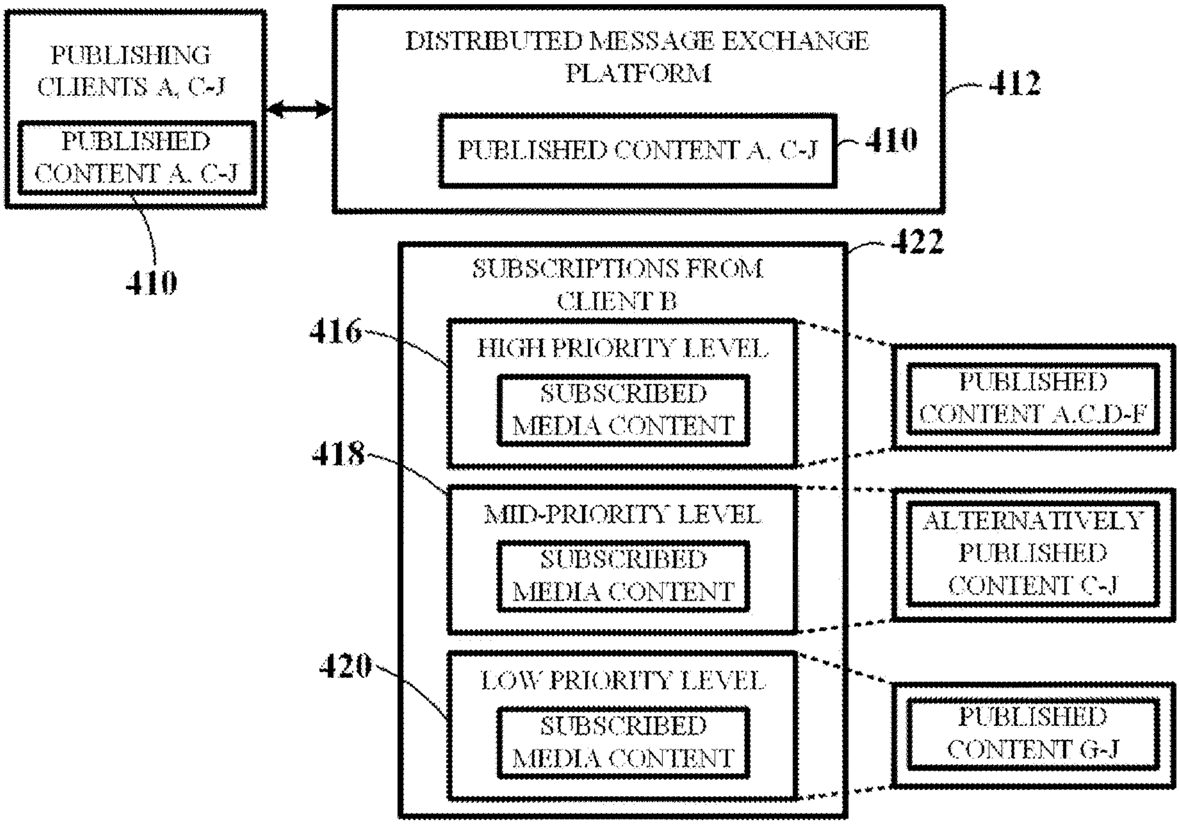

FIG. 4C shows an example of the LOD management of the current disclosure being used on the virtual room 400 of FIG. 4A considering the published media content items 410 from publishing client devices A, C-J, which are published in the distributed message exchange platform 412, and which are subscribed to by client B, illustrated as subscriptions from client B 422 found in the first row 404. In this example illustration, media content items closer to user B, i.e., user A, user C in the first row 404, and users D-F in the second row 404, are considered high priority level subscriptions 416 by the client B. However, it may be as well that only the subscription to published media content of user A is considered by the system as high priority level data 416, because of user A being the speaker in the virtual room 400, and thus to optimize resources, users C-F may be considered, e.g., mid-priority level 418. The media content items may comprise published content items from clients A, and C-F (e.g., their user graphical representations) along with other media content items published, for example, by the creator of the virtual room, such as seats, ornaments, floors, and other items. Subscribed media content items in the third row 408, which include published content from clients G-J as well as other published media content items, may be classified as mid-or-low priority level 418-420. In some embodiments, the priority-level definition and corresponding LOD management may be dynamically adjusted based on the capacity of the system and the current load.

As detailed with reference to FIG. 3, subscription requests may be further performed based on a clicking action or other action (e.g., looking at for a determined number of seconds, waving at, gesturing at, blinking at, etc.) received from the subscribing client device. In such cases, the priority level is increased to enable a higher level of detail for the subscribed media content item. For example, if user A were to click on user J in order to communicate (e.g., speak, chat, share a file, etc.), then the subscribed user graphical representation of user J may be set at a high definition and framerate during that conversation. In other embodiments also described previously with reference to FIG. 3, priority data is further extracted based on one or more of an available bandwidth, user profile, type of content item, number of content items within the corresponding cell, number of user graphical representations within the corresponding cell, or orientation angle of the user graphical representation to the content item, or combinations thereof. Thus, the priority level classification may primarily be based on the distance within the virtual environment between the subscribing user graphical representation and published media content items within the field of view of the subscribing user, and then may utilize one or more of the parameters listed above to further adjust the priority level.

Figure 5:
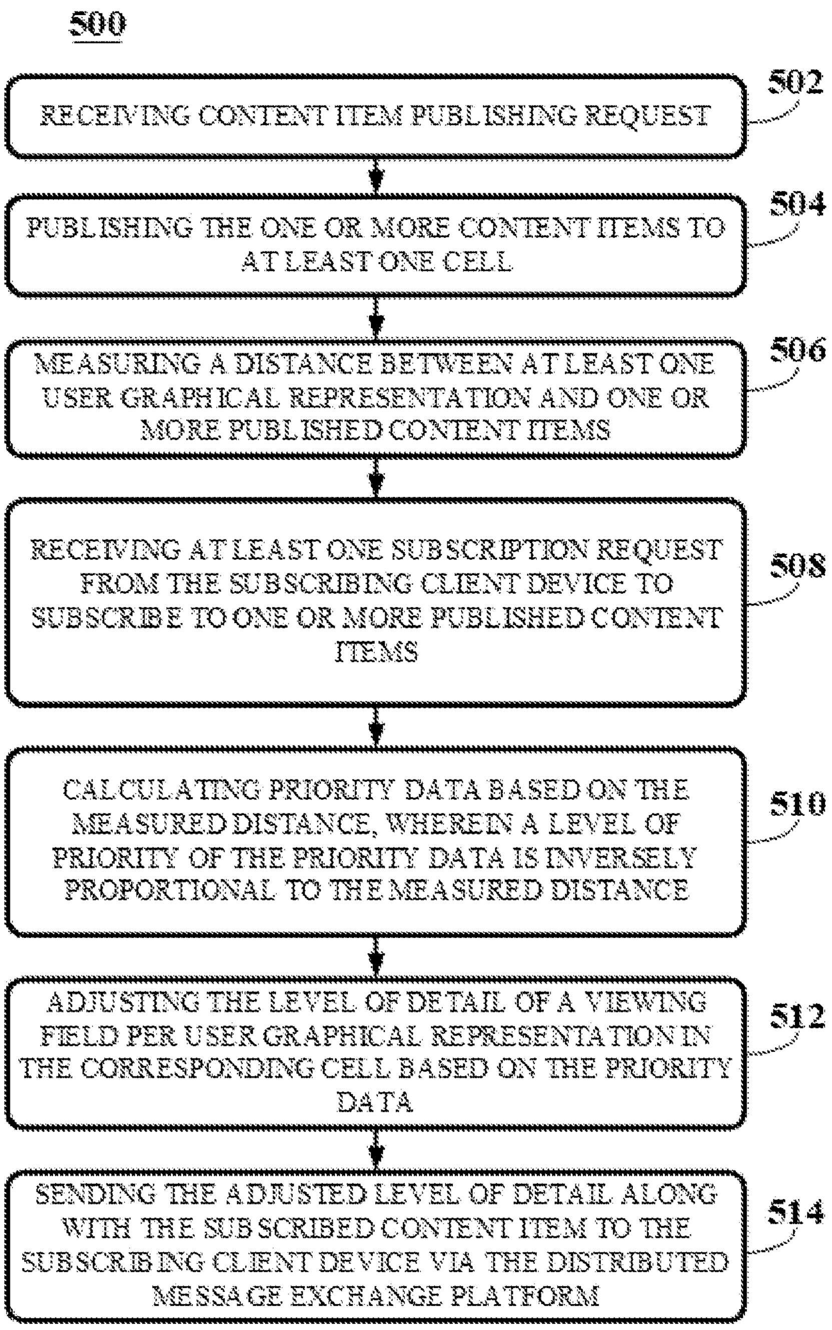
FIG. 5 depicts a flowchart of a method enabling level of detail (LOD) management in a virtual environment, according to an embodiment.

FIG. 5 depicts a block diagram of a method 500 enabling level of detail (LOD) management in a virtual environment, according to an embodiment. Method 500 may be implemented by a system, such as a system 100 described with reference to FIG. 1, comprising at least one server computer of a server computer system including at least one processor and memory storing a distributed message exchange platform. The at least one processor executes instructions in memory, causing the at least one server computer to perform at least some of the following steps.

Method 500 starts in step 502 by receiving from a publishing client device, by the distributed message exchange platform, one or more content item publishing requests, wherein at least one of the content items to be published is a user graphical representation of the publishing client device user. The media content items may further refer to any of 2D or 3D image data, 3D geometries, video data, media data, audio data, textual data, haptic data, time data, 3D entities, 3D dynamic objects, textual data, time data, priority data, security data, positional data, lighting data, depth data, infrared data, and corresponding metadata, amongst others.

Method 500 may proceed in step 504 by publishing the one or more content items to at least one cell representing at least one area of interest from at least one portion of a virtual environment arranged in a data structure. Then, in step 506, method 500 proceeds by measuring a distance within the virtual environment between at least one user graphical representation representing a subscribing client device and one or more published content items.

In step 508, (e.g., in response to the measured distance meeting a predefined threshold) the method 500 proceeds by receiving at least one subscription request from the subscribing client device to subscribe to one or more published content items. In step 510, method 500 continues by calculating priority data based on the measured distance, wherein a level of priority of the priority data is inversely proportional to the distance measured between the at least one user graphical representation and one or more published content items. In step 512, method 500 proceeds by adjusting the level of detail of a viewing field per user graphical representation in the corresponding cell based on the extracted priority data. Finally, in step 514, method 500 ends by sending the adjusted level of detail along with the subscribed media content item to the subscribing client device via the distributed message exchange platform.

In some embodiments, adjusting the level of detail comprises classifying subscriptions within a cell into the data structure as low, medium and high priority levels; and applying simplification operations on frames of lower priority levels within the data structure and refining operations on frames of higher priority levels within the data structure. In yet further embodiments, the simplification and refining operations comprise at least adjusting resolution and framerate of corresponding frames of the viewing field per user graphical representation. In yet further embodiments, the simplification and refining operations comprise at least adjusting resolution and framerate of corresponding frames of the viewing field per user graphical representation. In yet further embodiments, the adjusting the level of detail further comprises comprising performing sound enhancements comprising 3D sound treatment based on the priority levels.

In some embodiments, the virtual environment uses a data structure selected from one or more of an octree data structure, or a quadtree data structure, or a BSP tree data structure, or a sparse voxel octrees data structure, or 3D arrays, kD trees, point clouds, wireframes, boundary representations (B-Rep), constructive solid geometry trees (CSG trees), bintrees, and hexagonal structures.

In some embodiments, the virtual environment is hosted as part of a videoconferencing platform enabling video communications between users.

In some embodiments, the user graphical representation is created by a process comprising receiving, by the server, a live data feed captured by at least one camera of a publishing client device; sending the captured data to the subscribing client device; performing a background removal of the user of the publishing client device in order to extract only the image representing the user; and inserting, by the subscribing client device, the user graphical representation into the virtual environment.

In some embodiments, the user graphical representation comprises a user 3D virtual cutout with a removed background, or a user real-time 3D virtual cutout with a removed background, or a video with a removed background, or a video without a removed background.

In some embodiments, the subscription request is further performed based on a clicking action received from the subscribing client device.

In some embodiments, the priority data is further extracted based on one or more of an available bandwidth, user profile, type of content item, number of content items within the corresponding cell, number of user graphical representations within the corresponding cell, or orientation angle of the user graphical representation to the content item.

In some embodiments, the user profile comprises data classifying the user as a speaker or a listener.

In some embodiments, the at least one server computer is a media server computer using a multipoint conferencing unit (MCU) topology, or a selective forwarding unit (SFU) topology, or a Traversal Using Relay NAT (TURN) topology, or a spatially analyzed media server topology (SAMS).

Computer-readable media having stored thereon instructions configured to cause one or more computers to perform any of the methods described herein are also described. As used herein, the term "computer readable medium" includes volatile and nonvolatile and removable and nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft. NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A level of detail management method comprising:

receiving, by a distributed message exchange platform, one or more publishing requests to publish one or more media content items, wherein at least one of the media content items is a user graphical representation;

publishing the one or more media content items to at least one portion of the virtual environment, wherein at least one of the published media content items is the user graphical representation;

measuring a distance within the virtual environment between the published user graphical representation representing a subscribing client device and one or more other published media content items published to the virtual environment;

calculating priority data based on the measured distance, wherein a level of priority of the priority data is inversely proportional to the measured distance;

receiving a subscription request from the subscribing client device, to subscribe to the one or more other published media content items;

adjusting, by a level of detail management module, a level of detail of a viewing field of the published user graphical representation based on the level of priority; and sending the adjusted level of detail along with the subscribed media content item to the subscribing client device.

2. The method of claim 1, wherein adjusting the level of detail comprises: classifying subscriptions within the cell as low, medium and high priority levels; and applying simplification operations on frames of a low priority level and refining operations on frames of a high priority level.

3. The method of claim 2, wherein the simplification and refining operations comprise at least adjusting resolution and framerate of corresponding frames of the viewing field per user graphical representation.

4. The method of claim 2, wherein the refining operations comprise application of a pixel-aligned implicit function framework on the user graphical representations.

5. The method of claim 2, further comprising performing sound enhancements comprising 3D sound treatment based on the priority levels.

6. The method of claim 1, wherein the user graphical representation is created by a process comprising: receiving a live data feed captured by at least one camera of a publishing client device; sending the captured data to the subscribing client device; performing a background removal of the user of the publishing client device in order to extract only the image representing the user; and inserting, by the subscribing client device, the user graphical representation into the virtual environment.

7. The method of claim 1, wherein the user graphical representation comprises a user 3D virtual cutout with a removed background, or a user real-time 3D virtual cutout with a removed background, or a video with a removed background, or a video without a removed background.

8. The method of claim 1, wherein the subscription request is performed based on a clicking action or other action received from the subscribing client device.

9. The method of claim 1, wherein the priority data is adjusted based on one or more of an available bandwidth, user profile, type of content item, number of content items within the viewing field, number of user graphical representations within the viewing field, or orientation angle of the user graphical representation to the content item.

10. The method of claim 9, wherein the priority data is further adjusted on whether a user is a speaker or a listener.

11. A level of detail management system comprising:

a computer system including at least one processor and memory, the computer system being programmed to:

receive, via a distributed message exchange platform, one or more publishing requests to publish one or more media content items, wherein at least one of the media content items is a user graphical representation;

publish the one or more media content items to at least one portion of a virtual environment, wherein at least one of the published media content items is the user graphical representation;

measure a distance within the virtual environment between the user graphical representation representing a subscribing client device and the one or more other published media content items;

receive a subscription request from the subscribing client device to subscribe to the one or more other published content items;

calculate priority data based on the measured distance, wherein a level of priority of the priority data is inversely proportional to the measured distance;

adjust a level of detail of a viewing field of the published user graphical representation based on the level of priority; and send the adjusted level of detail along with the subscribed content item to the subscribing client device via the distributed message exchange platform.

12. The system of claim 11, wherein adjusting adjust the level of detail comprises classifying subscriptions within the cell as low, medium and high priority levels; and applying refining operations on frames of a high priority levels, wherein the refining operations comprise at least adjusting resolution and framerate of corresponding frames of the viewing field per user graphical representation.

13. The system of claim 12, wherein the refining operations comprise application of a pixel-aligned implicit function framework on the user graphical representations.

14. The system of claim 12, wherein the refining operations further comprise sound enhancements comprising 3D sound treatment based on the priority levels.

15. The system of claim 11, wherein the virtual environment uses one or more of an octree data structure, a quadtree data structure, a binary space partitioning (BSP) tree data structure, a sparse voxel octree data structure, a 3D array, a k-dimensional (kD) tree, a point cloud, a wireframe model, a boundary representation (B-Rep), a constructive solid geometry tree (CSG tree), a bintree, or a hexagonal structure.

16. The system of claim 11, wherein the subscription request is performed based on a clicking action or other action received from the subscribing client device.

17. The system of claim 11, wherein the virtual environment is hosted as part of a videoconferencing platform enabling video communications between users.

18. The system of claim 11, wherein the priority data is adjusted based on one or more of an available bandwidth, user profile, type of content item, number of content items within the corresponding viewing field, number of user graphical representations within the corresponding viewing field, or orientation angle of the user graphical representation to the content item.

19. The system of claim 11, wherein the computer system comprises a media server computer using a multipoint conferencing unit (MCU) topology, or a selective forwarding unit (SFU) topology, or a Traversal Using Relay NAT (TURN) topology, or a spatially analyzed media server topology (SAMS).

20. A non-transitory computer-readable medium having stored thereon instructions configured to cause one or more server computers comprising a processor and memory to perform steps comprising:

receiving, by a distributed message exchange platform distributed across a plurality of server computers of a server computer system, one or more media content items and one or more publishing requests;

publishing the one or more media content items to at least one portion of a virtual environment, wherein at least one of the published media content items is a user graphical representation;

measuring a distance within the virtual environment between the published user graphical representation representing a subscribing client device and one or more other published media content items published to the virtual environment;

receiving a subscription request from the subscribing client device to subscribe to the one or more other published media content items;

calculating priority data based on the measured distance, wherein a level of priority of the priority data is inversely proportional to the measured distance;

adjusting a level of detail of a viewing field of the published user graphical representation based on the level of priority; and sending the adjusted level of detail along with the content item to the subscribing client device via the distributed message exchange platform.

* * * * *